(12) United States Patent
Waters

(10) Patent No.: US 9,487,346 B2
(45) Date of Patent: Nov. 8, 2016

(54) BICYCLE BAG

(71) Applicant: Gabriel S. Waters, Highland, UT (US)

(72) Inventor: Gabriel S. Waters, Highland, UT (US)

( * ) Notice: Subject to any disclaimer, the term of this patent is extended or adjusted under 35 U.S.C. 154(b) by 0 days.

(21) Appl. No.: 14/535,076

(22) Filed: Nov. 6, 2014

(65) Prior Publication Data
US 2015/0060315 A1    Mar. 5, 2015

Related U.S. Application Data

(63) Continuation of application No. 13/483,970, filed on May 30, 2012, now Pat. No. 8,881,776.

(60) Provisional application No. 61/492,183, filed on Jun. 1, 2011.

(51) Int. Cl.
*B60J 7/20*        (2006.01)
*B65D 85/68*    (2006.01)
*B62J 11/00*     (2006.01)
*B62J 19/00*     (2006.01)

(52) U.S. Cl.
CPC ............... *B65D 85/68* (2013.01); *B62J 11/00* (2013.01); *B62J 19/00* (2013.01)

(58) Field of Classification Search
CPC ........... B60R 9/10; B62J 23/00; B62J 35/00; B65H 1/0007
USPC ............. 150/167, 166, 154; 296/78.1, 136.1, 296/136.07, 136.04; 206/335
See application file for complete search history.

(56) References Cited

U.S. PATENT DOCUMENTS

| | | | | |
|---|---|---|---|---|
| 4,356,831 A | * | 11/1982 | Adams | B62J 19/00 150/167 |
| 4,598,725 A | * | 7/1986 | Brewer | A41D 3/08 135/119 |
| 6,405,771 B1 | * | 6/2002 | Mote | B62J 19/00 150/167 |
| 8,881,776 B2 | * | 11/2014 | Waters | 150/167 |
| 2005/0247387 A1 | * | 11/2005 | Hooker | B62J 19/00 150/167 |
| 2010/0019532 A1 | * | 1/2010 | Hooker | B60J 11/00 296/136.1 |
| 2011/0036474 A1 | * | 2/2011 | Phillips | B60J 11/00 150/167 |
| 2012/0305425 A1 | * | 12/2012 | Waters | B62J 19/00 206/335 |

* cited by examiner

*Primary Examiner* — Fenn Mathew
*Assistant Examiner* — Cynthia Collado

(57) ABSTRACT

A bicycle bag protects a bicycle while the bicycle is secured to a rack, such as a vehicle bicycle rack. The bicycle bag includes resealable openings configured to allow the bicycle (and bag) to be securely attached to a wide variety of different rack types. Additionally, because there is risk of obscuring the tail lights of a vehicle for rear-mount racks when a bicycle bag is on the bike and the bike on the rack, the bicycle bag includes pockets designed to support a tail-light system that can be connected to the vehicle to provide additional lighting and safety.

20 Claims, 3 Drawing Sheets

BICYCLE BAG

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc., applications of the Priority Application(s)).

PRIORITY APPLICATIONS

U.S. patent application Ser. No. 13/483,970 entitled "Bicycle Bag," filed on May 30, 2012, and U.S. Provisional Patent Application Ser. No. 61/492,183 entitled "Bicycle Bag," filed on Jun. 1, 2011.

RELATED APPLICATIONS

If the listings of applications provided herein are inconsistent with the listings provided via an ADS, it is the intent of the Applicants to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to a bicycle bag and, in particular, to a bicycle bag that provides protection from the elements while the bike with bicycle bag are on a rack, and that can be used with a large variety of different bicycle and rack types.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION OF PREFERRED EMBODIMENTS

When a bicycle is secured to a rack the bicycle can become dirty or damaged due to exposure to the elements, road debris, vandalism, theft, and the like. As used herein a "rack" refers to any mechanism for securing a bicycle including, but not limited to: a vehicle rack configured to secure one or more bicycles to a vehicle for transport, a storage rack to storing a bicycle, a parking rack for bicycle storage, or the like. Bicycle covers or (bicycle "bags") can be used to reduce this exposure. However, most existing bicycle bags do not provide sufficient protection. Moreover, bicycle bags that attempt to provide additional protection by covering the bicycle while in transit are often incompatible with certain vehicle rack systems, making their use dangerous and impractical. Moreover, these bags can be incompatible with certain bicycle types or frame configurations and/or may prevent bicycles from being "packed together" for transport. In some cases, when a bicycle is mounted on a vehicle rack, the bicycle (or bicycle bag) may obscure portions of the lighting system of the vehicle, such as the brake lights, turn signals, backup lights, and the like.

The bicycle bag disclosed herein addresses these and other shortcomings. The disclosed bicycle bag provides full coverage for a bicycle while on a rack. As used herein "full coverage" refers to a bicycle being fully enclosed by a bag, such that the bicycle is protected from outside elements, such as moisture, road debris, or the like. Accordingly, "full coverage" refers to a bicycle being fully enclosed within material of the bicycle bag, with no portions of the bicycle protruding therefrom. In some embodiments, the bicycle bag includes resealable openings configured to allow the bicycle bag to be used with a large variety of different rack types. The openings may be adapted such that the bicycle is protected whether or not the openings are in use. The disclosed bicycle bag may include pockets adapted to receive a lighting system, which may be used when the bicycle bag obscures the lighting system of the vehicle.

Various embodiments of a bicycle bag are disclosed herein. The disclosed bicycle bags provide advantages over existing bags. The features described with respect to the various embodiments may be combined in any suitable fashion.

The bicycle bag disclosed herein may be configured to allow a bicycle enclosed therein to be secured to a plurality of different rack types and/or securing mechanisms, which may include, but are not limited to: a tray-type rack, a post-type rack, a fork rack, bicycle straps, J-hooks, arm clamps, or the like.

Figure 1A:
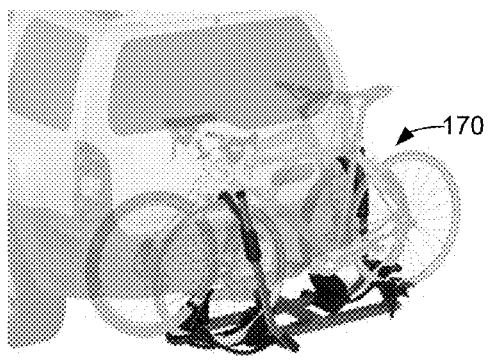
FIG. 1A depicts an exemplary tray-type bicycle rack.
Figure 1B:
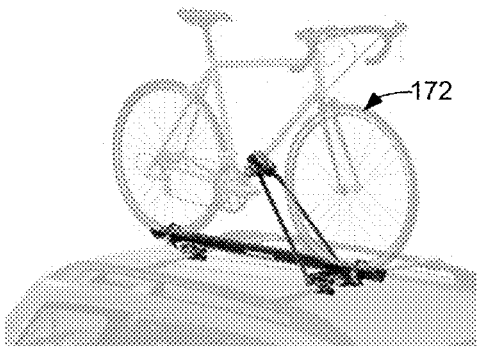
FIG. 1B depicts another exemplary tray-type bicycle rack.
Figure 1C:
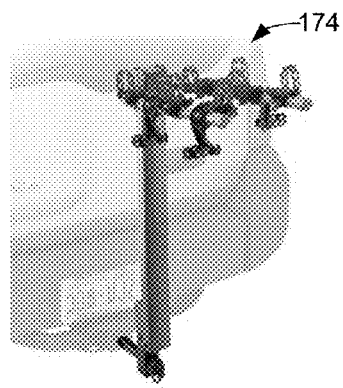
FIG. 1C depicts an exemplary post-type bicycle rack.
Figure 1D:
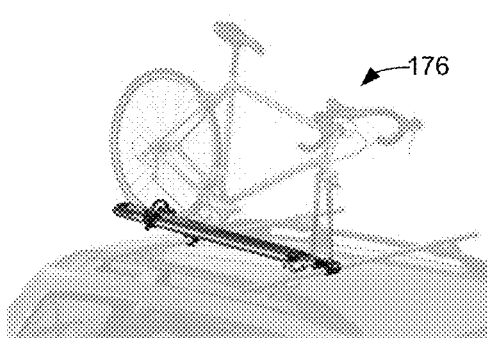
FIG. 1D depicts an exemplary fork-type bicycle rack.

FIG. 1A depicts an exemplary tray-type bicycle rack 170. The rack 170 may comprise a J-bar to secure a wheel of a bicycle and one or more wheel trays. The one or more wheel trays may comprise respective straps for securing bicycle wheels thereto. FIG. 1B depicts another exemplary tray-type rack. The wheel tray of the rack 172 may comprise one or more wheel straps for securing a bicycle to the tray. The rack 172 may comprise a stabilizer bar configured to secure a bicycle in an upright position. The arm clamp may be configured to releasably secure one or more frame members of a bicycle (e.g., the downtube of a bicycle). As shown in FIG. 1B, the arm clamp may be configured to secure a bicycle in an upright position on the rack 172. FIG. 1C depicts an exemplary post-type rack 174. The rack 174 comprises one or more posts to which a bicycle frame may be secured. The one or more posts may comprise respective straps for securing a bicycle thereto. FIG. 1D depicts an exemplary fork-type rack 176. The rack 176 may comprise a wheel tray having one or more straps to secure a bicycle wheel thereto. The rack 176 may further comprise a fork receptacle for securing a bicycle frame.

Figure 2:
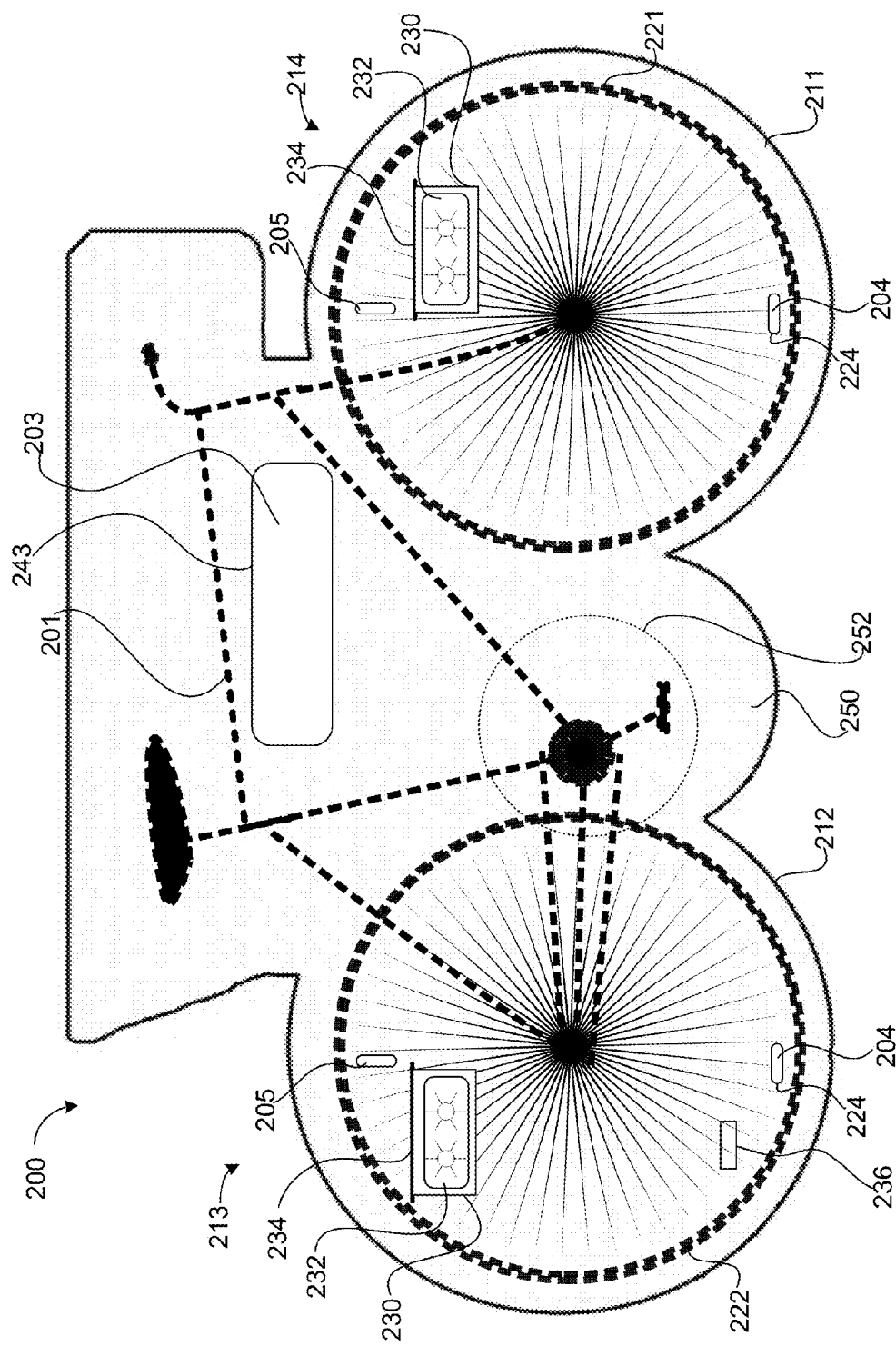
FIG. 2 depicts one embodiment of a bicycle bag.

FIG. 2 depicts one embodiment of a bicycle bag 200 configured to allow a bicycle enclosed therein to be secured to a plurality of different rack types. The bicycle bag 200 may be constructed of any suitable material including, but not limited to: canvas, Kevlar®, neoprene, nylon, polyester, plastic, rigid plastic, metal, or the like, and/or combinations of different materials. The bag 200 (or portions thereof) may be formed from materials that are resistant to the elements. For example, the bag 200 may be formed from materials that provide protection from moisture (e.g., water proofing), provide ballistic protection from high-velocity road debris, are tamper resistant (e.g., include structural members, such as Kevlar® or metallic filaments or fibers, that resist cutting or tearing), or the like. In some embodiments, portions of the bag 200 (and/or the openings 203 and 204 therein) may be formed from flexible materials capable of adapting to different bicycle 201 and/or rack configurations. For example, the materials forming the opening 203 and/or resealable closure 243 thereof (discussed below) may be capable of expanding and/or deforming to adapt to different rack and/or bicycle 201 types. The flexible portions may be configured to allow the bag 200 to enclose bicycles 101 of different sizes and/or types.

As illustrated in FIG. 2, bottom portions 211 and 212 of the bag 200 may be configured to generally conform to the shape of a bicycle 201 disposed therein. For example, the portion 211 may be configured to conform to the curvature of the front wheel 221 and the portion 212 may be configured to conform to the curvature of the rear wheel 222. The portions 211 and 212 may be configured to allow the bag 200 to be used with bicycle racks that secure the bicycle 201 using curved wheel trays, such as the tray-type bicycle racks 170, 172, and/or 176. The curvature of the bottom portions 211 and 212 of the bag 200, allows a bicycle 201 disposed within the bag 200 to be secured by such a rack by, inter alia, securing the wheels 221 and 222 of the bicycle 201 within curved wheel trays of the rack.

The bag 200 may further comprise one or more resealable openings 204 in the wheel portions 211 and/or 212. The openings 204 may be configured to allow a strap (or other securing mechanism) to pass through the bag 200 to secure one or more of the wheels 221 and/or 222 to, inter alia, a tray of a tray-type rack. The openings 204 may allow a securing mechanism to pass through the bag 200 and bicycle wheel 221/222 when the bicycle 201 is in the bicycle bag 200. The openings 204 may comprise respective resealable closures 224, which allow the bicycle 201 to be placed within the bag 200 and/or removed from the bag 200 (e.g., by disengaging the resealable closures 224 of the openings 204). The resealable closure 224 may comprise any suitable mechanism including, but not limited to: VELCRO®, a zipper, fastening straps, buttons, or the like. The resealable closure 224 may be configured to protect the bicycle 201 from the elements (e.g., moisture, debris, etc.). The openings 204 (and resealable closures 224) may be configured to avoid impinging on structural elements (e.g., spokes) of the bicycle 201. Accordingly, in alternative embodiments, the openings may be narrowed and/or oriented vertically (along the radius of the wheels 221 and/or 222) so that the openings 204 may accept a securing member of a rack, while minimizing the chance of the openings impinging on wheel spokes or other components of the bicycle 201. In some embodiments, the openings 204 may not be resealable, but may comprise one or more gaskets, flaps, elastics, or the like, that are configured to protect the interior portion of the bag 200 from the elements.

The bag 200 may further comprise resealable openings 205 disposed near the top portions 213 and 214 of the bag 200. The resealable openings 205 may comprise respective resealable closures (not shown) configured to selectively open and/or seal the openings 205. The openings 205 may be used to secure the bicycle 201 (and bag 200) to an upper portion of a rack (e.g., an over the wheel rack). As depicted in FIG. 2, the openings 205 may be configured to prevent impinging on the structural components of the bicycle 201 (e.g., the wheels 221,222 and/or the spokes thereof).

In some embodiments, the bag 200 comprises a resealable opening 203 disposed near the center of the bag 200. The opening 203 may be configured to create an opening within a diamond portion 203 of the bicycle 201 frame (under a top-tube of and/or above a down tube of the bicycle 201). The resealable opening 203 may be configured to allow the bicycle 201 to be secured to a post-type rack (e.g., a rack that secures a frame of the bicycle 201 to one or more posts or the like, such as the bicycle rack 174). For example, the opening 203 may be configured to provide for passing one or more posts of a post-type rack through the bicycle 201 within the bicycle bag 200, such that the bicycle 201 may be secured thereto.

The opening 203 may be opened by disengaging the resealable closure 243, which allows the bicycle 201 to be placed within the bag 200 and/or removed from the bag 200. The resealable closure 243 may comprise any suitable mechanism including, but not limited to: VELCRO®, a zipper, fastening straps, buttons, or the like. The resealable closure 243 may be configured to prevent the elements (e.g., moisture, debris, etc.), from entering the interior of the bag 200. The resealable closure 243 may be disengaged (e.g., opened) to allow the bicycle 201 to be placed within the bag 200 (or removed therefrom). The resealable closure 243 may re-sealed when the bag 200 is used for transport. In some embodiments, the opening 204 may not be resealable, and may comprise one or more gaskets, flaps, elastics, or the like, to protect the interior of the bag 200 from the elements.

In some embodiments, a top portions 213 and 214 of the bag 200 are configured to conform to the top portion of each wheel 221 and 222. The top portions 213 and 214 allow the bicycle 201 (within the bag 200) to be secured to a "J-shaped" rack that secures the bicycle 201 using one or more "over-the wheel" J-shaped members, such as the bicycle rack 172 of FIG. 1A. Similarly, the portions 213 and 214 may allow the bicycle 201 and bag 200 to be secured to conventional shaped bicycle parking racks.

Although a particular set of resealable openings 203, 204, and/or 205 are depicted herein, one of skill in the art would recognize that the bag 200 could be adapted to include additional openings configured to allow the bag 200 to be used with different rack types and/or different bicycle 201 configurations. Accordingly, the disclosure should not be read as limited to any particular set of openings. For example, in some embodiments, the bag 200 may include one or more openings (not shown) or tabs (not shown), which may be used to secure or lock the bag 200 to a rack (or other structure).

In some embodiments, the bag 200 comprises one or more pockets 230. The pockets 230 may be integrated into the bag 200 itself and/or may be removably attached thereto. The pockets 230 may be configured to receive tail lights 232. The tail lights 232 may comprise any suitable lighting mechanism including, but not limited to: brake lights, turn signals, backup lighting, etc. The tail lights may be secured within the pockets 230 without the need for special brackets or other mechanisms. Accordingly, in some embodiments, the pockets 230 include a securing member 234 or flaps adapted to secure a tail light 232 therein (e.g., a zipper closure, VELCRO®, or the like). An exterior facing portion of the pockets 230 may be formed from a transparent material to allow light from the tail lights 232 to emit therefrom.

The bag 200 may provide an electrical connection between the pockets 230 and an exterior portion of the bag 200. For example, the bag 200 may include an electrical connection 236 configured to receive an electrical connection from a vehicle, such as a trailer hitch electrical connection or the like. The electrical connection 236 may be disposed on a lower portion of the bag 200 to be proximate to a hitch electrical connection of a vehicle. The electrical connection 236 may be electrically coupled to each of the one or more pockets 230. Accordingly, each of the two or more pockets 230 may include an electrical connection (not shown) in electrical communication with the electrical connection 236. The electrical coupling may be implemented using conductors embedded within material of the bag 200, conductors in the interior of the bag 200, conductors along the exterior of the bag 200, or the like. In some embodiments, the bag 200 may also comprise an electrical coupling output (not shown) to connect two or more of the bags 200 electrically in serial.

The bag 200 may comprise a resealable closure (not shown) along a bottom portion of the bag 200. The resealable closure may be selectively opened to allow a bicycle 201 to be placed within the bag 200 and/or removed therefrom. The resealable closure may comprise any suitable mechanism including, but not limited to: Velcro®, a zipper, buttons, or the like. The resealable closure may be configured to protect the bicycle 201 from the elements when closed. Accordingly, the resealable closure may be waterproof and/or tamper resistant. In some embodiments, the resealable closure may include a locking mechanism to prevent the resealable closure from being opened. Alternatively, or in addition, the bag 200 may comprise a resealable closure along the top portion of the bag 200. The top-portion resealable closure may allow a bicycle 201 to be placed within (or removed) from the top portion of the bag 200.

The bag 200 may further comprise a portion 250 configured to allow the pedals and/or crank of the bicycle 201 to rotate therein. The pedals and/or crank may rotate within an arc 252 within the bag 200. Accordingly, the portion 250 may comprise a sufficient interior volume to accommodate various bicycle pedal and/or crank configurations. The rotation 252 of the pedals and/or crank may facilitate arranging two or more bicycles next to one another on a rack. For example, the pedals of the two or more bicycles may interfere with one another when oriented side-by-side in a rack. The rotation 252 of the bicycle 201 pedals and/or crank may allow the pedals to offset one another, allowing the bicycles to be placed in closer proximity.

As discussed above, the bag 200 may be formed from a material configured to provide protection from the elements while the bicycle 201 is transported on a vehicle. Accordingly, the bag 200 may be formed from waterproof material and/or material that provides ballistic protection (e.g., protection from high-velocity road debris).

Figure 3:
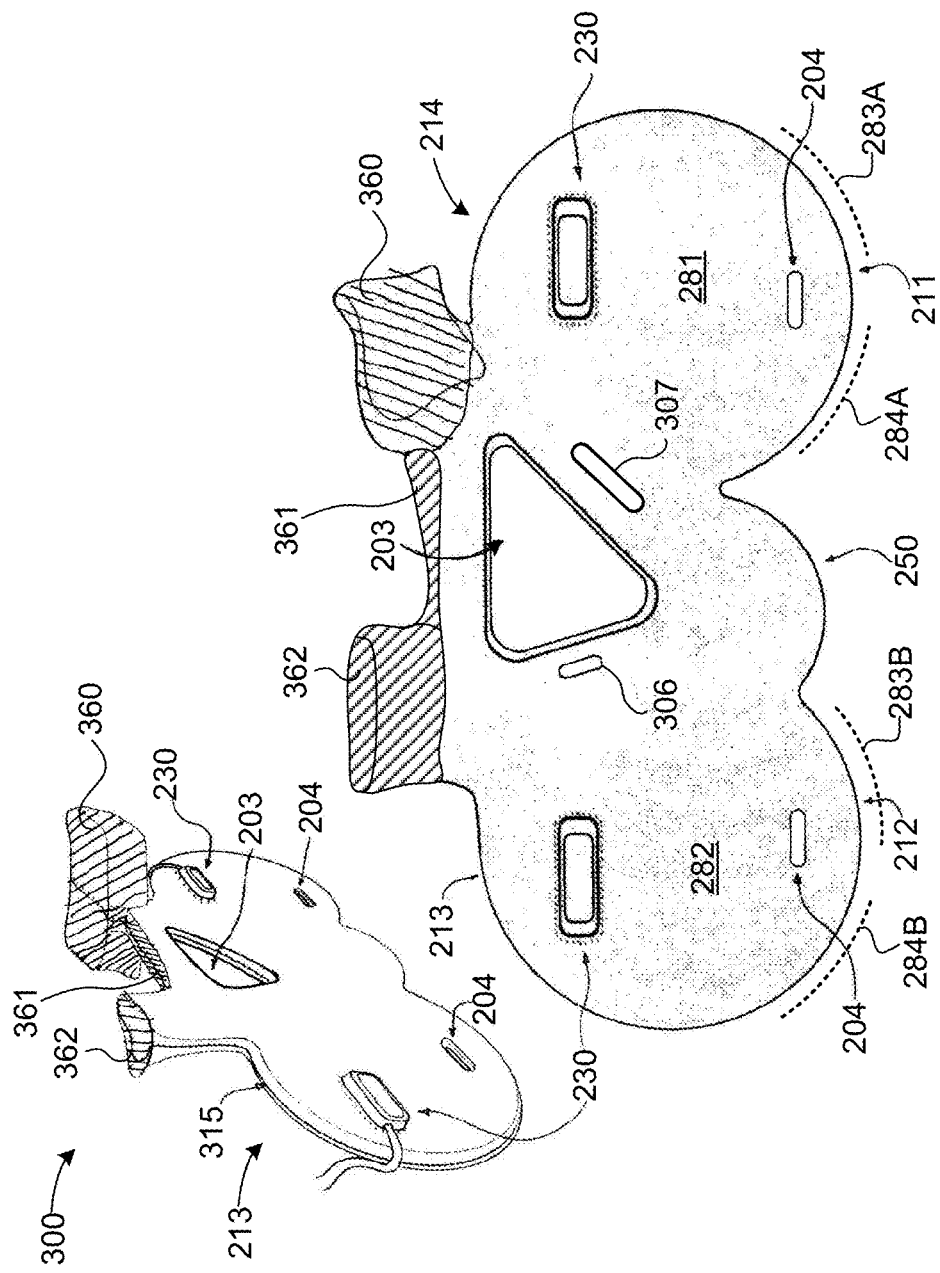
FIG. 3 depicts another embodiment of a bicycle bag.

FIG. 3 illustrates other aspects of a bicycle bag as disclosed herein. The bicycle bag 300 comprises a resealable opening 315 running along a top rear portion and bottom of the bag 300. The resealable opening 315 may be configured to receive a bicycle into an interior portion of the bag 300. As described above, portions of the bag 300 may be formed from deformable and/or flexible material, such as spandex, neoprene, or the like. In the FIG. 300 example, a handlebar compartment 360, a top-tube portion 361, and a seat portion 362 of the bag may be formed from a deformable material, which may allow the bag 300 to accommodate bicycles of different sizes and/or configurations. For example, the handlebar compartment 360 of the bag may be configured to receive handlebars of varying widths and/or heights. Similarly, the top tube portion 361 may be deformable to accommodate bicycles of varying lengths, and the seat portion 362 may be deformable to accommodate bicycles of varying height. The bicycle bag 300 may be provided in different sizes and/or configurations. For example, the bag 300 may be provided in small, medium, and/or large sizes to accommodate a large range of bicycles sizes (e.g., frame sizes from 40 to 64 cm). Similarly, the bag 300 may be provided with different handlebar compartment 360 types, including, but not limited to: a road bike compartment configured to receive road bike handlebars, a mountain bike compartment configured to receive wider mountain bike handle bars, and/or a cruiser compartment configured to receive wide bar types. In some embodiments, the handle bar compartment 360 may be removable and/or modular, such that the bag 300 may switch between road, mountain, and/or cruiser handler bar compartments. Alternatively, or in addition, the handle compartment 360 may comprise one or more straps, expansion sleeves, or the like, to allow a user to change the configuration of the handlebar compartment 300 (and/or other portions of the bag 300) to accommodate a particular size and/or style of bicycle.

As shown in FIG. 3, the opening 103 may be provided in a diamond shape to fit a wide variety of post-type racks. The opening 203 may be resealable, as described above. The bag 300 may further comprise a seat-tube opening 306 configured to allow a rack to secure a seat tube of a bicycle within the bag 300. A down-tube opening 307 may be configured to allow a rack to secure a down tube of a bicycle within the bag 300. In some embodiments, the opening 204 may be configured to allow a fork of the bicycle to protrude from the bag 300, such that the fork may be secured to a fork-type rack (e.g., rack 176).

As described above, bottom portions 211 and 212 of the wheel compartments 281 and 282 may be configured to conform to a contour of the wheels of the bicycle. Accordingly, the wheel compartments 281 and/or 282 may be configured to allow the wheels of the bicycle to be secured to a tray-type rack and/or be secured using a wheel slot or clamp (or similar mechanism). As shown in FIG. 3, the wheel compartment 281 may be configured to allow a front portion 283A and/or rear portion 284A of the front wheel to be secured to a tray and/or wheel slot or clamp. The wheel compartment 282 may be configured to allow a front portion 283B and/or read portion 284B of the rear wheel to be secured to a tray and/or wheel slot or clamp. In addition, the openings 204 may be used to secure the front and/or rear wheels to various rack types, as described above.

Top portions 213 and 214 of the wheel compartments 281 and 282 may conform to top portions of the bicycle wheels. As such, the wheel compartments 281 and/or 282 may be configured to allow the bicycle to be secured to an over-the-wheel rack, a J-hook, or similar mechanism. The bag 300 may further comprise pockets 230 to receive lighting, a crank compartment 250 configured to allow a bicycle crank and/or pedals to rotate within the bag 300, as described above.

It will be understood by those having skill in the art that changes may be made to the details of the above-described embodiments without departing from the underlying principles presented herein. For example, any suitable combination of various embodiments, or the features thereof, is contemplated.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this Detailed Description are hereby expressly incorporated into this Detailed Description, with each claim standing on its own as a separate embodiment. This disclosure includes all permutations of the independent claims with their dependent claims. Recitation in the claims of the term "first" with respect to a feature or element does not necessarily imply the existence of a second or additional such feature or element. Elements specifically recited in means-plus-function format, if any, are intended to be construed in accordance with 35 U.S.C. §112 ¶6.

I claim:

1. A bicycle bag, comprising:
   an interior configured to enclose a bicycle;
   a first sealable opening configured to receive the bicycle into the interior of the bicycle bag, the first sealable opening comprising a first closure mechanism having an open configuration to receive the bicycle into the interior of the bicycle bag through the first sealable opening, and a sealed configuration to seal the first sealable opening of the bicycle bag;
   a second sealable opening comprising an opening from an exterior of a left side panel of the bicycle bag through to an exterior of a right side panel of the bicycle bag, the second sealable opening comprising
      an opening on the left side panel of the bicycle bag,
      an opening on the right side panel of the bicycle bag, and
      a second closure mechanism having an open configuration to receive the bicycle into the interior of the bicycle bag and a sealed configuration to seal the interior of the bicycle bag through the opening on the left side panel and the opening on the right side panel while the second sealable opening provides the opening from the exterior of the left side panel of the bicycle bag through to the exterior of the right side panel of the bicycle bag.

2. The bicycle bag of claim 1, further comprising a third opening in wheel compartment of the bicycle bag configured to provide access to a wheel of the bicycle enclosed within the interior of the bicycle bag.

3. The bicycle bag of claim 1, further comprising a third opening in a front end of the bicycle bag configured to provide access to a fork of the bicycle enclosed within the interior of the bicycle bag.

4. The bicycle bag of claim 1, wherein the second sealable opening is configured to receive one or more posts of a post-type rack to pass through the bicycle enclosed within the interior of the bicycle bag.

5. The bicycle bag of claim 1, further comprising a front wheel compartment configured to conform to a shape of a bottom portion of a front wheel of the bicycle enclosed within the interior of the bicycle bag.

6. The bicycle bag of claim 1, further comprising a front wheel compartment configured to conform to a shape of a top portion of a front wheel of the bicycle enclosed within the interior of the bicycle bag.

7. The bicycle bag of claim 1, further comprising a crank compartment of the bicycle bag configured to allow a crank of the bicycle enclosed within the interior of the bicycle bag to rotate within the bicycle bag.

8. The bicycle bag of claim 1, wherein the bicycle bag comprises a handlebar compartment configured to receive handlebars of the bicycle enclosed within the interior of the bicycle bag, and wherein the handlebar compartment is formed of a deformable material.

9. The bicycle bag of claim 1, wherein the bicycle bag comprises a seat compartment configured to receive a seat of the bicycle enclosed within the interior of the bicycle bag, and wherein the seat compartment is formed of a deformable material.

10. The bicycle bag of claim 1, wherein a top-tube portion of the bicycle bag is formed of a deformable material.

11. The bicycle bag of claim 1, further comprising:
    a third opening configured to provide for securing a seat tube of the bicycle within the bicycle bag; and
    a fourth opening configured to provide for securing a down tube of the bicycle within the bicycle bag.

12. A bicycle bag, comprising:
    an interior of the bicycle bag to enclose a bicycle; and
    a sealable opening in the bicycle bag configured to provide an opening that passes through the bicycle bag from an exterior of a first side of the bicycle bag to an exterior of a second side of the bicycle bag, the sealable opening comprising,
       a first side opening on a first side of the bicycle bag,
       a second side opening on a second side of the bicycle bag, and
       a closure mechanism to seal the first side opening and the second side opening, the closure mechanism having an open configuration and a sealed configuration,
          wherein, in the open configuration of the closure mechanism, the interior of the bicycle bag is accessible through one or more of the first side opening and the second side opening,
          wherein, in the sealed configuration of the closure mechanism, the closure mechanism is configured to seal access to the interior of the bicycle bag through the first side opening and the second side opening, and wherein the closure mechanism of the sealable opening is configured to provide the opening that passes through the bicycle bag from the exterior of the first side of the bicycle bag to the exterior of the second side of the bicycle bag when the closure mechanism is in the sealed configuration.

13. The bicycle bag of claim 12, further comprising an opening in a wheel compartment of the bicycle bag configured to provide access to a wheel of the bicycle enclosed within the interior of the bicycle bag.

14. The bicycle bag of claim 13, wherein the opening in the wheel compartment of the bicycle bag is resealable.

15. The bicycle bag of claim 13, wherein the opening in the wheel compartment of the bicycle bag is configured to provide for passing a strap through the wheel of the bicycle enclosed within the interior of the bicycle bag.

16. An apparatus, comprising:
a bicycle bag comprising an interior portion configured to receive a bicycle;
a first resealable opening in the bicycle bag configured to allow a bicycle to be placed within the interior portion of the bicycle bag;
a sealable pass-through opening through the interior of the bicycle bag from an exterior of a first side of the bicycle bag to an exterior of a second side of the bicycle bag, the sealable pass-through opening comprising,
a first side opening formed in a first side panel of the bicycle bag, the first side opening comprising an outer-edge of material forming the first side panel of the bicycle bag;
a second side opening formed in a second side panel of the bicycle bag, the second side opening comprising an outer edge of material forming the second side panel of the bicycle bag, and
a closure mechanism configured to seal the outer edge of the first side opening to the outer edge of the second side opening such that the interior of the bicycle bag is sealed through the first side opening and the second side opening,
wherein the closure mechanism further configured to unseal the outer edge of the first side opening from the outer edge of the second side opening to allow the bicycle to be placed within the interior portion of the bicycle bag through the first resealable opening, and
wherein the closure mechanism is configured to provide the sealable pass-through from the exterior of a first side of the bicycle bag to the exterior of a second side of the bicycle bag, through the first side opening and the second side opening, when the outer edge of the first side opening is sealed to the outer edge of the second side opening.

17. The apparatus of claim 16, wherein the bicycle bag comprises a rear wheel compartment configured to conform to a shape of a rear wheel of the bicycle enclosed within the interior of the bicycle bag.

18. The apparatus of claim 16, wherein the bicycle bag comprises a handlebar compartment configured to receive handle bars of one of a road bicycle, a mountain bicycle, and a cruiser bicycle.

19. The apparatus of claim 18, wherein the handlebar compartment is formed of a deformable material.

20. The apparatus of claim 16, wherein the bicycle bag comprise a pocket configured to receive a light.

* * * * *